(12) United States Patent
Nabi

(10) Patent No.: US 11,718,167 B2
(45) Date of Patent: Aug. 8, 2023

(54) RETRACTABLE VEHICLE COVER APPARATUS

(71) Applicant: Farooq Nabi, Irvine, CA (US)

(72) Inventor: Farooq Nabi, Irvine, CA (US)

( * ) Notice: Subject to any disclaimer, the term of this patent is extended or adjusted under 35 U.S.C. 154(b) by 544 days.

(21) Appl. No.: 16/862,178

(22) Filed: Apr. 29, 2020

(65) Prior Publication Data

US 2021/0339613 A1 Nov. 4, 2021

(51) Int. Cl.
*B60J 11/04* (2006.01)

(52) U.S. Cl.
CPC ..................................... *B60J 11/04* (2013.01)

(58) Field of Classification Search
CPC .................................... B60J 11/04; B60J 11/02
See application file for complete search history.

(56) References Cited

U.S. PATENT DOCUMENTS

| 5,804,799 | A | 9/1998 | Stewart |
| 5,989,356 | A | 11/1999 | Candeletti |
| 6,654,978 | B2 | 12/2003 | Bouchard |
| 6,696,674 | B1 | 2/2004 | Doornsbosch |
| 8,146,984 | B2 | 4/2012 | Devereaux |
| 8,584,295 | B1 | 11/2013 | Yeaglin |
| 9,834,181 | B2 | 12/2017 | Livingston |
| 2009/0282708 | A1 | 11/2009 | Reed |
| 2009/0294430 | A1 | 12/2009 | Andrade |
| 2019/0337371 | A1* | 11/2019 | Rother, Sr. ............... B60J 11/04 |
| 2020/0331331 | A1* | 10/2020 | Houston .................. B60J 11/02 |

FOREIGN PATENT DOCUMENTS

| CN | 214295535 U | * | 9/2021 | .............. B06J 11/04 |
| KR | 200171551 Y1 | * | 3/2000 | .............. B60J 11/04 |

* cited by examiner

*Primary Examiner* — Sue A Weaver

(57) ABSTRACT

A retractable vehicle cover apparatus for protecting vehicles from the elements includes a housing with a housing frontside having a cover aperture extending through to a housing inside. A plurality of adjustable feet is coupled to a housing bottom side. An axle is coupled within the housing inside and a crank extends through a housing right side to be in rotate the axle. A cover comprises a main cover panel coupled to the axle and a pair of side covers coupled to the main cover panel. The cover is windingly retractable and extendable around the axle. A hook is coupled to a distal end of the cover and is configured to selectively engage a bumper of a vehicle.

11 Claims, 7 Drawing Sheets

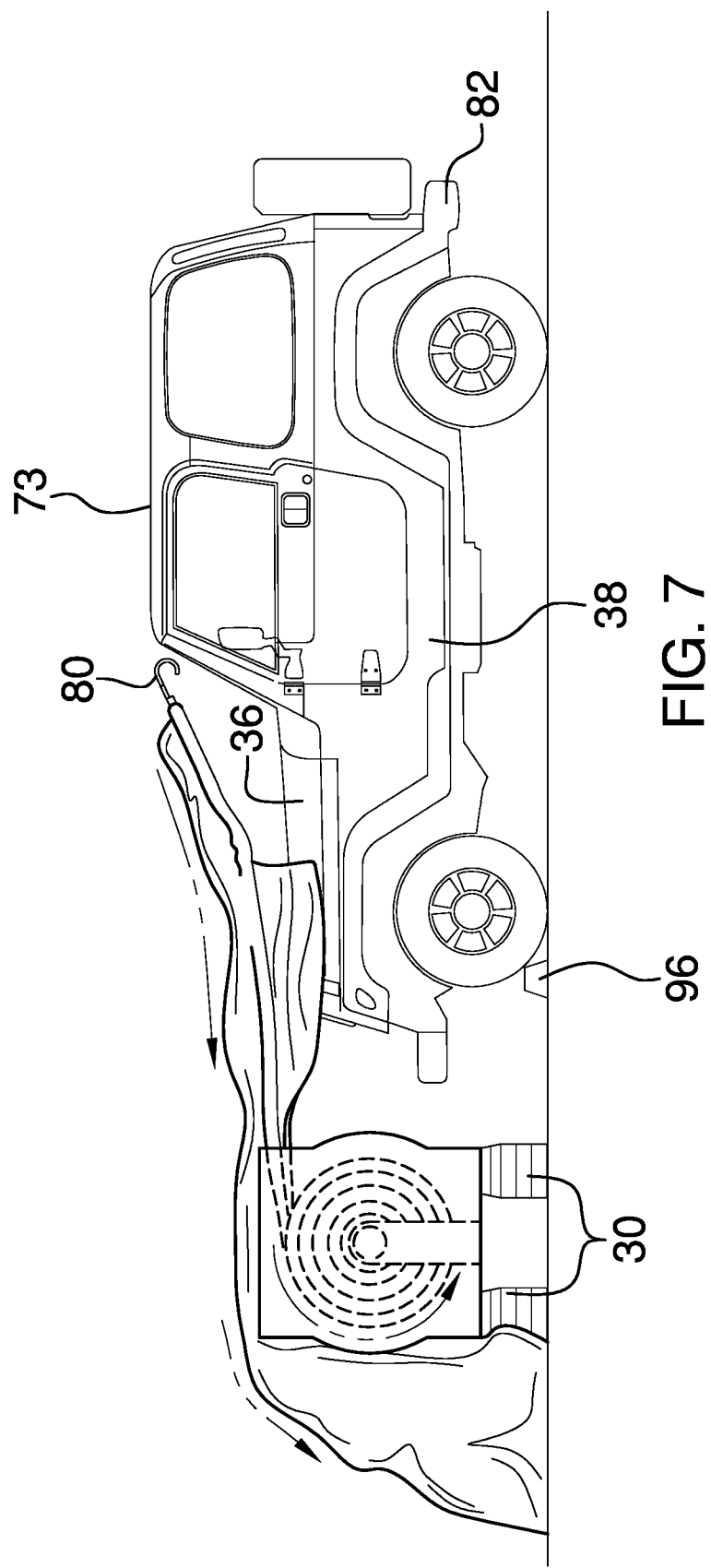

RETRACTABLE VEHICLE COVER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle cover devices and more particularly pertains to a new vehicle cover device for protecting vehicles from the elements.

(2) Description of Related Art Including Information Disclosed Under 37 CFR 1.97 and 1.98

The prior art relates to vehicle cover devices. Existing devices may be retractable and offer integrated heating elements to prevent snow buildup, however such devices heat the cover itself rather than within the housing. Furthermore, the housing on known devices is not adjustable height to allow for smooth operation along vehicles of different heights. Finally, the covers on known devices do not include interior roller wheels to easily pass over the top of the vehicle.

BRIEF SUMMARY OF THE INVENTION

An embodiment of the disclosure meets the needs presented above by generally comprising a housing having a housing front side, a housing back side, a housing left side, a housing right side, a housing top side, and a housing bottom side defining a housing inside. The housing frontside has a cover aperture extending through to the housing inside. A plurality of adjustable feet is coupled to the housing bottom side. An axle is coupled to the housing left side and the housing right side within the housing inside. A crank is coupled to the housing and extends through the housing right side to be in operational communication with the axle. A cover is coupled to the axle. The cover comprises a main cover panel coupled to the axle and a pair of side covers coupled to the main cover. The pair of side covers is coupled to a pair of outer edges of the main cover panel. The main cover panel has a proximal end coupled to the axle and a distal end extending through the cover aperture. The cover is windingly retractable and extendable around the axle. A hook is coupled to the distal end and is configured to selectively engage a bumper of a vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 7 is a side elevation in-use view of an embodiment of the disclosure.

DETAILED DESCRIPTION OF THE INVENTION

Figure 1:
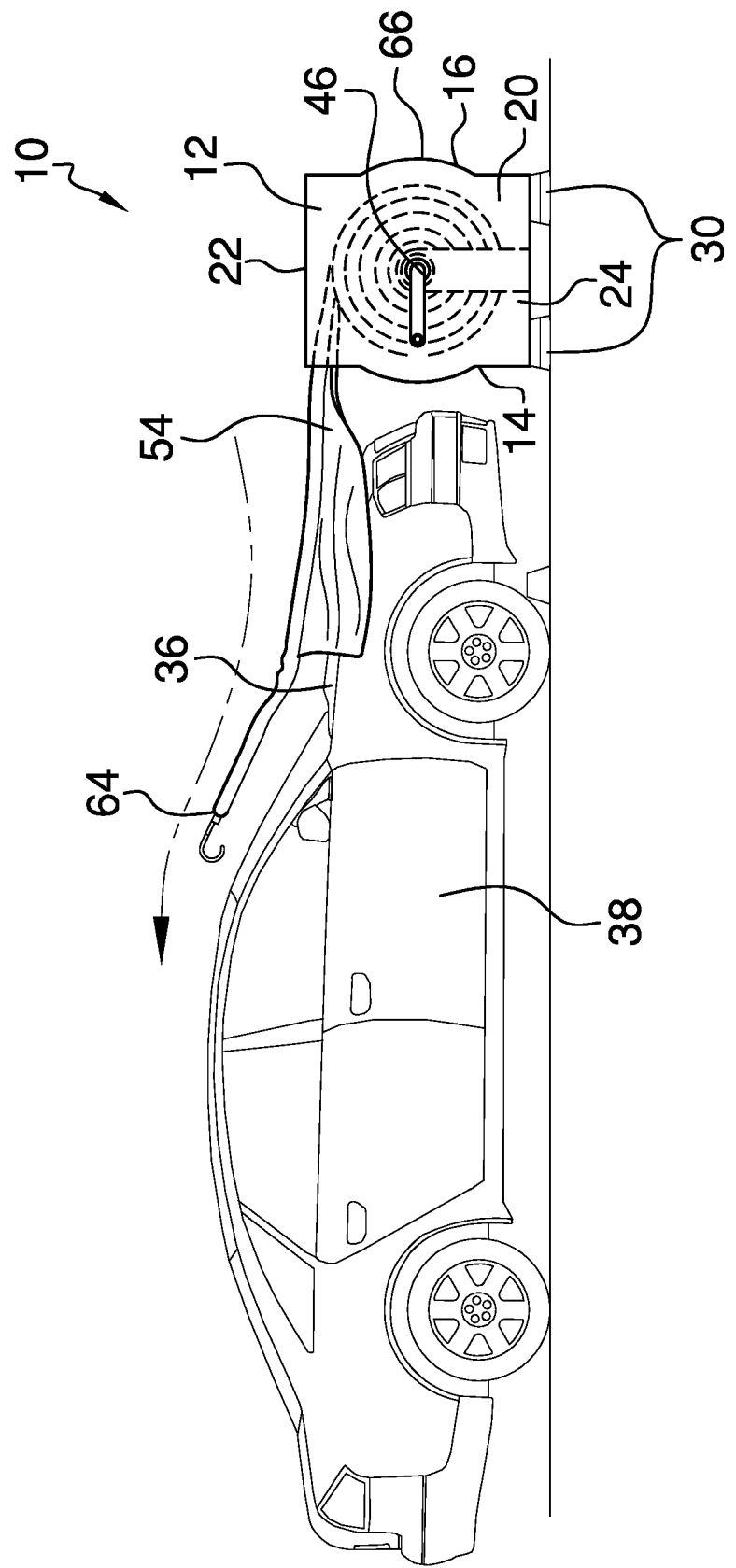
FIG. 1 is a side elevation in-use view of a retractable vehicle cover apparatus according to an embodiment of the disclosure
Figure 2:
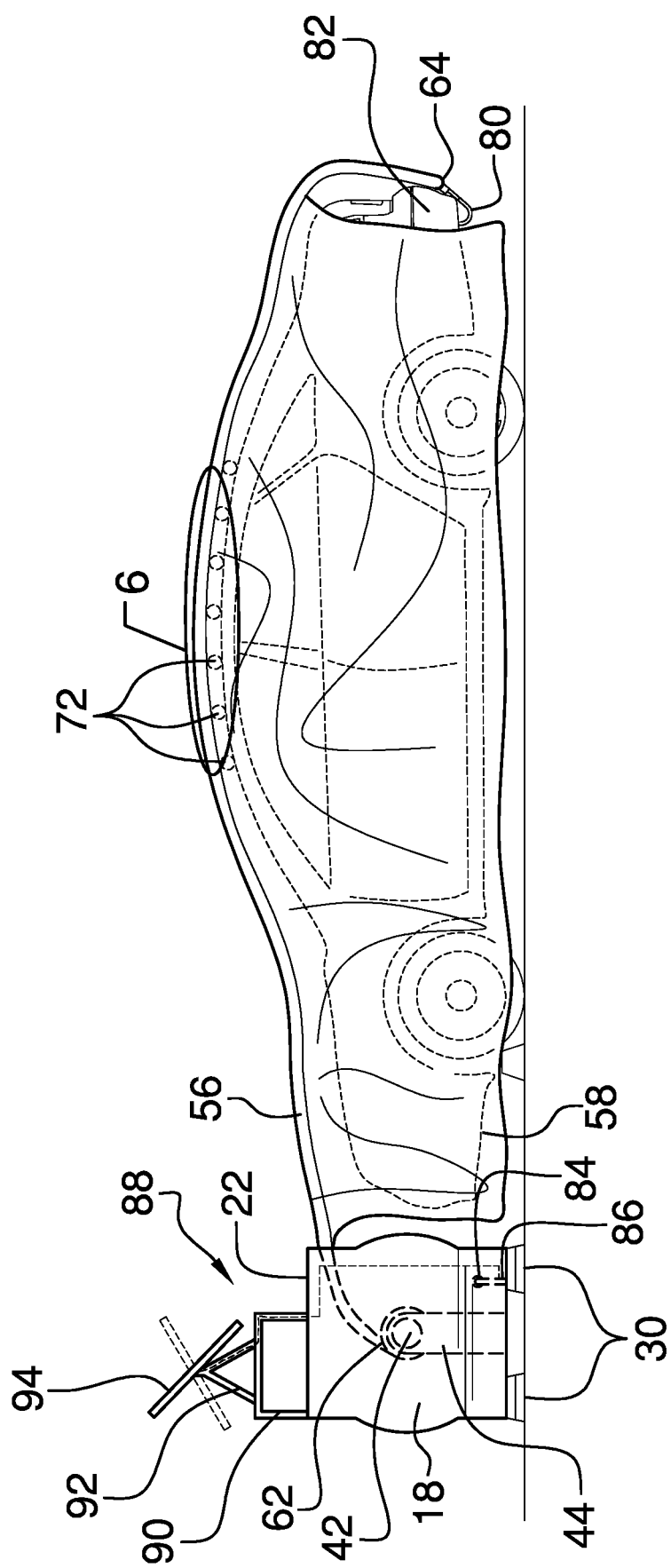
FIG. 2 is a side elevation in-use view of an embodiment of the disclosure.
Figure 3:
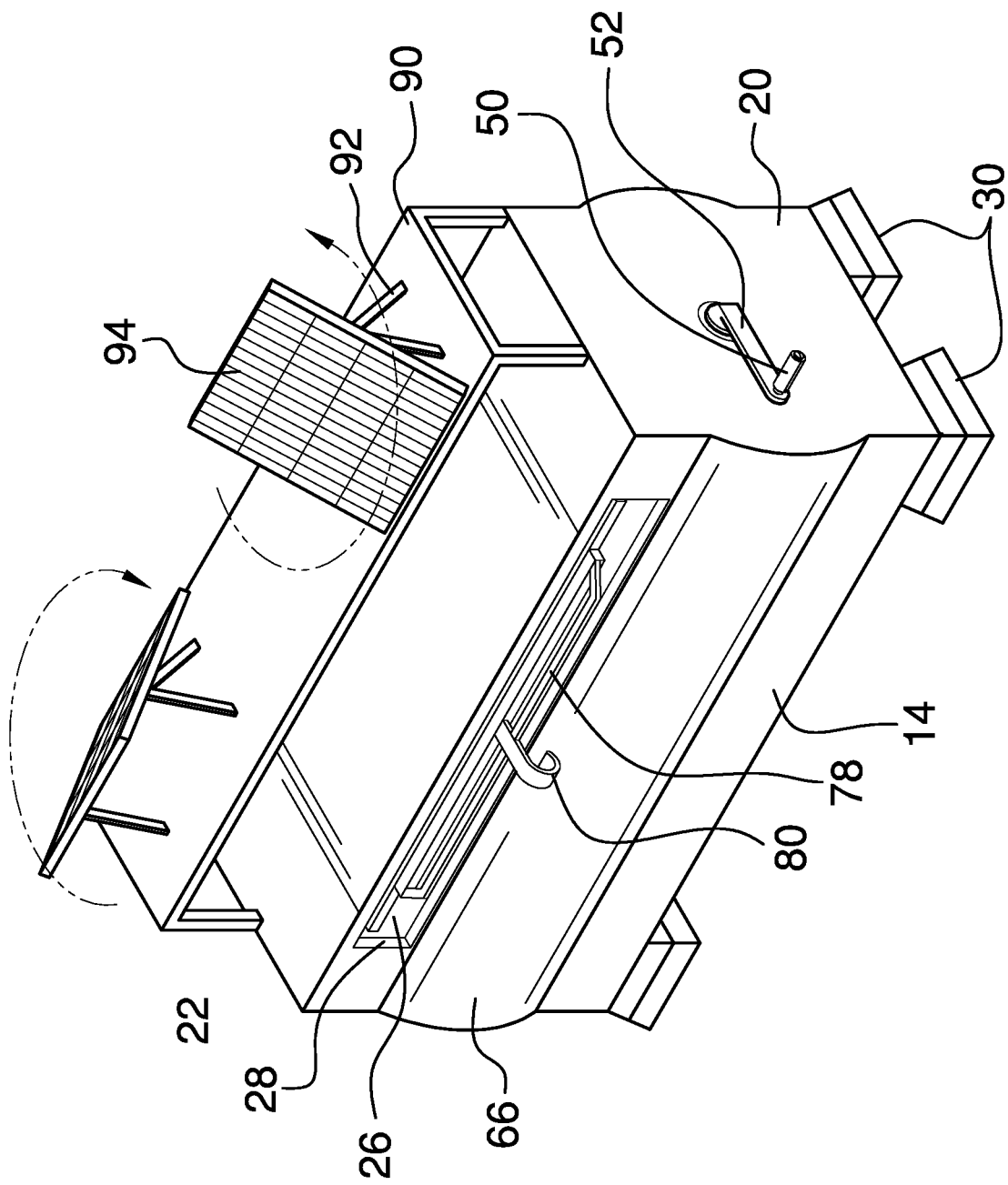
FIG. 3 is an isometric view of an embodiment of the disclosure.
Figure 4:
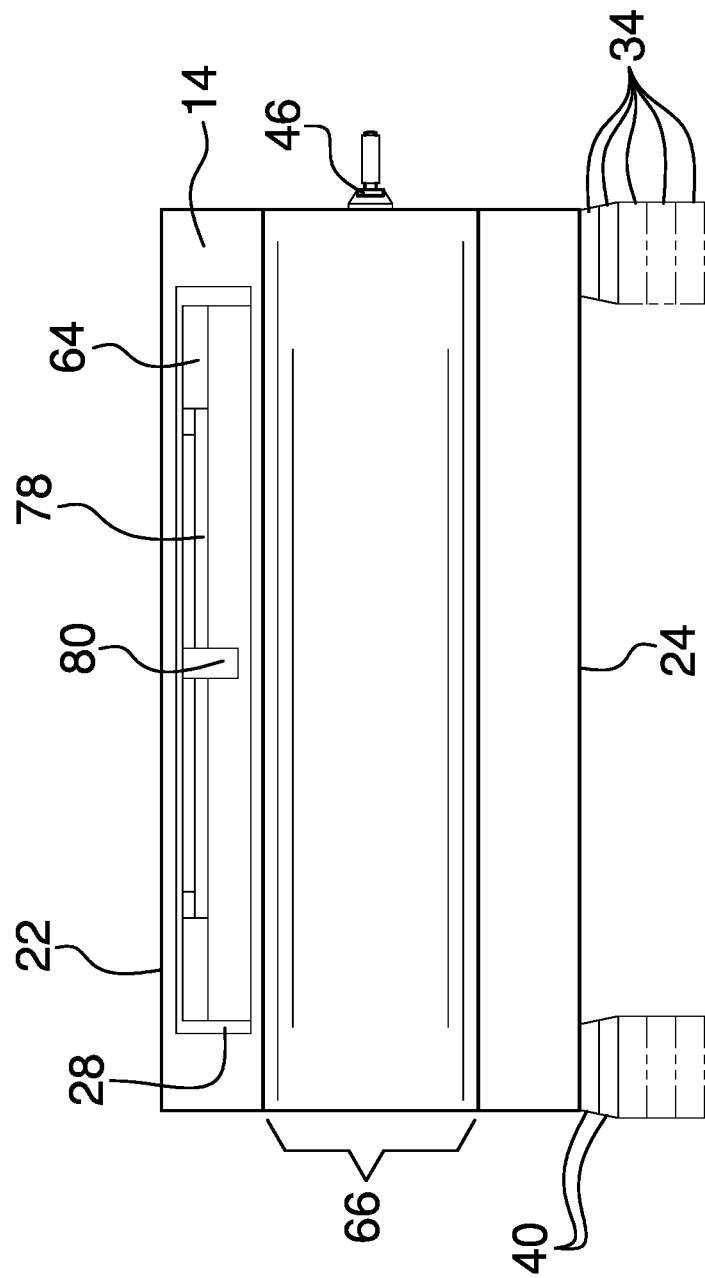
FIG. 4 is a front elevation view of an embodiment of the disclosure.
Figure 5:
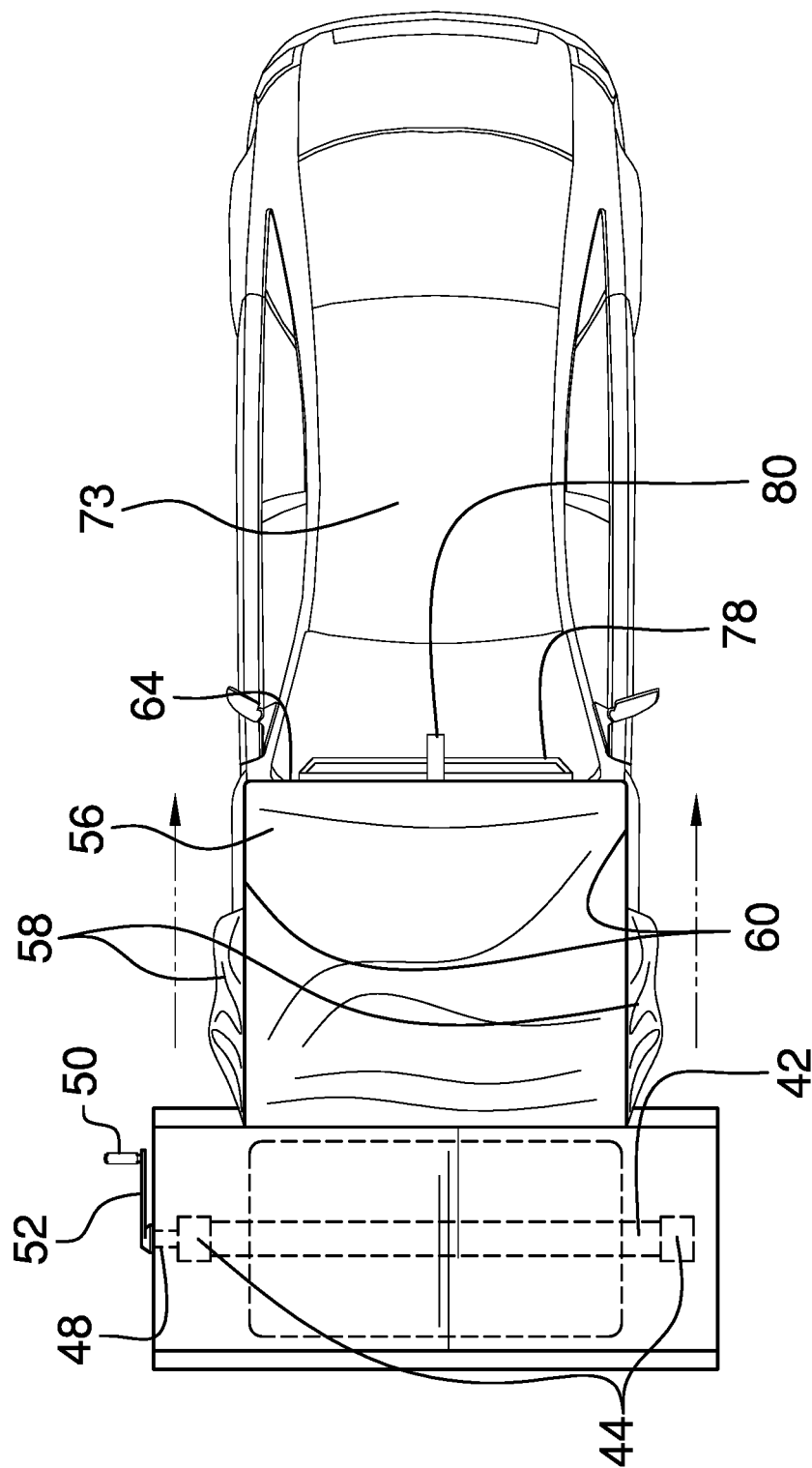
FIG. 5 is a top plan in-use view of an embodiment of the disclosure.

With reference now to the drawings, and in particular to FIGS. 1 through 7 thereof, a new vehicle cover device embodying the principles and concepts of an embodiment of the disclosure and generally designated by the reference numeral 10 will be described.

As best illustrated in FIGS. 1 through 7, the retractable vehicle cover apparatus 10 generally comprises a housing 12 having a housing front side 14, a housing back side 16, a housing left side 18, a housing right side 20, a housing top side 22, and a housing bottom side 24 defining a housing inside 26. The housing frontside 14 has a cover aperture 28 extending through to the housing inside 26. The cover aperture 28 may be rectangular and may be adjacent the housing top side 22.

A plurality of adjustable feet 30 is coupled to the housing bottom side 24. Each adjustable foot 30 may comprise a plurality of stackable pieces 34. Each stackable piece 34 is selectively engageable to adjust the height of the cover aperture 28 to conform to a height of a hood 36 of a vehicle 38. The plurality of feet 30 may be four feet 30 located at the corners of the housing bottom side 24. A pair of upper pieces 40 of the plurality of stackable pieces 34 may be tapered.

An axle 42 is rotatably coupled to the housing left side 18 and the housing right side 20 within the housing inside 26. The axle 42 may alternatively have a pair of axle supports 44 coupled to the housing bottom side 24. A crank 46 is coupled to the housing 12. The crank 46 may have a drive shaft 48 extending through the housing right side 20 to be in operational communication with the axle 42. The crank 46 may have a rotatable handle portion 50 perpendicularly extending from a crank arm 52 coupled to the drive shaft 48. The crank 46 may be motorized.

A cover 54 comprises a main cover panel 56 coupled to the axle 42 and a pair of side covers 58 coupled to the main cover panel 56. The pair of side covers 58 is coupled to a pair of outer edges 60 of the main cover. The main cover panel 56 has a proximal end 62 coupled to the axle 42 and a distal end 64 extending through the cover aperture 28. The cover 54 is windingly retractable and extendable around the axle 42. When fully extended out of the cover aperture 28 the distal end 64 may reach at least 20 feet from the housing front side 14. Each of the housing front side 14 and the housing back side 16 may have a rounded bulge portion 66 to accommodate the cover 54 when wound around the axle 42 to allow smaller footprint for the housing 12.

Figure 6:
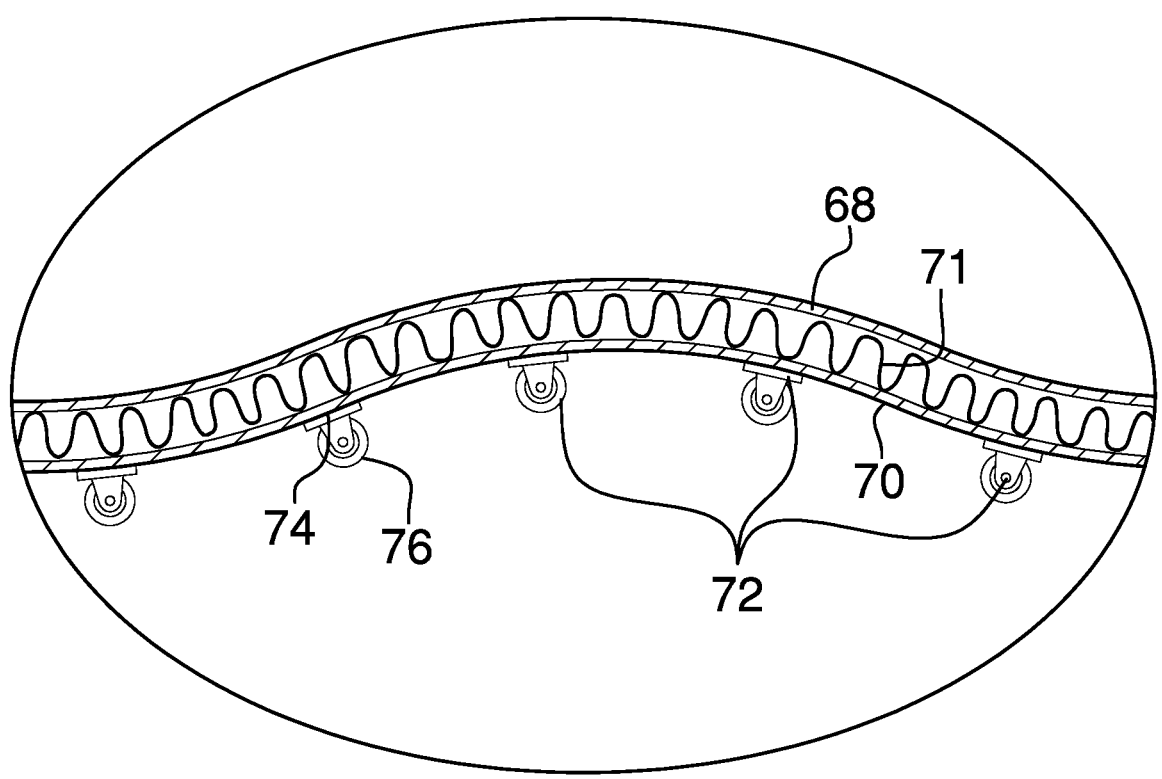
FIG. 6 is a detail view of an embodiment of the disclosure.

The main cover panel 56 may comprise an outer cover side 68, an inner cover side 70, and a flexible cushion layer 71 coupled therebetween. The outer cover side 70 may be a waterproof material, the inner cover side 70 may be a soft material to prevent damage to the vehicle 38, and the cushion layer 71 may have a sinusoidal cross-section as shown in FIG. 6. The cushion layer 71 provides a flexible, resilient thickness to the main cover panel 56. A cover thickness of the main cover panel 56 may be at least two inches.

A plurality of wheels 72 may be coupled to the inner cover side 70 of the main cover panel. The plurality of wheels 72 is configured to rest on a roof 73 of the vehicle when the cover 54 is fully extended from the housing 12. Each wheel 72 may have a wheel mount 74 coupled to the inner cover side 70 and a rubberized tire 76 coupled to the wheel mount 74. The wheel mount 74 may be selectively engageable with the inner cover side 70 to allow the user to add and remove wheels 72 as needed depending on the size of the vehicle 38.

A pull handle 78 is coupled to the main cover panel 56. The pull handle 78 may be trapezoidal and is coupled to the distal end 64. The pull handle 78 provides a grip location for the user to extend the cover 54 over the vehicle 38. A hook 80 is coupled to the distal end 64 and is configured to selectively engage a bumper 82 of the vehicle to secure the cover 54 in place. The hook 80 extends past the pull handle 78. The pull handle 78 and the hook 80 may both be plasticized to avoid damage to the vehicle 38.

A heating element 84 may be coupled to the housing 12 within the housing inside 26. A power supply 86 is coupled to the housing 12 and is in operational communication with the heating element 84. The power supply 86 may be a solar panel system 88 having a panel mount 90 coupled to the housing top side 22, a pair of triangular panel arms 92 coupled to the panel mount 90, and a solar cell panel 94 pivotably coupled to the pair of panel arms 92. The heating element 84 maintains the temperature within the housing inside 26 above 35° Fahrenheit to prevent the cover 54 from freezing after it has been used in the snow or rain.

In use, the housing 12 is positioned in front of a parking space. A parking block 96 may be positioned to prevent the user from parking the vehicle 38 too close to the housing 12. The user then secures the pull handle 78 to extend the cover 54 over the vehicle 38 until the hook 80 can be engaged with the bumper 82. The side covers 58 are allowed to drape down over the vehicle. When done, the hook 80 is disengaged and the crank 46 is rotated to retract the cover 54 through the cover aperture 28 to be wound around the axle 42. The crank 46 may be lockable and may include a payment system to allow users to pay for a single use of the apparatus 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A retractable vehicle cover apparatus comprising:
   a housing having a housing front side, a housing back side, a housing left side, a housing right side, a housing top side, and a housing bottom side defining a housing inside, the housing frontside having a cover aperture extending through to the housing inside;
   a plurality of adjustable feet coupled to the housing, the plurality of adjustable feet being coupled to the housing bottom side;
   an axle coupled to the housing, the axle being rotatably coupled to the housing left side and the housing right side within the housing inside;
   a crank coupled to the housing, the crank extending through the housing right side to be in operational communication with the axle;
   a cover coupled to the axle, the cover comprising a main cover panel coupled to the axle and a pair of side covers coupled to the main cover, the pair of side covers being coupled to a pair of outer edges of the main cover panel, the main cover panel having a proximal end coupled to the axle and a distal end extending through the cover aperture, the cover being windingly retractable and extendable around the axle;
   a hook coupled to the main cover panel, the hook being coupled to the distal end and configured to selectively engage a bumper of a vehicle; and
   a plurality of wheels coupled to the cover, the plurality of wheels being coupled to an inner cover side of the main cover panel, the plurality of wheels being configured to rest on a roof of the vehicle when the cover is fully extended from the housing.

2. The retractable vehicle cover apparatus of claim 1 further comprising each of the housing front side and the housing back side having a rounded bulge portion to accommodate the cover when wound around the axle.

3. The retractable vehicle cover apparatus of claim 1 further comprising the crank having a rotatable handle portion.

4. The retractable vehicle cover apparatus of claim 1 further comprising each wheel having a wheel mount coupled to the inner cover side and a rubberized tire coupled to the wheel mount.

5. The retractable vehicle cover apparatus of claim 1 further comprising the main cover panel comprising an outer cover side, the inner cover side, and a flexible cushion layer coupled therebetween.

6. A retractable vehicle cover apparatus comprising:
a housing having a housing front side, a housing back side, a housing left side, a housing right side, a housing top side, and a housing bottom side defining a housing inside, the housing frontside having a cover aperture extending through to the housing inside;
a plurality of adjustable feet coupled to the housing, the plurality of adjustable feet being coupled to the housing bottom side;
an axle coupled to the housing, the axle being rotatably coupled to the housing left side and the housing right side within the housing inside;
a crank coupled to the housing, the crank extending through the housing right side to be in operational communication with the axle;
a cover coupled to the axle, the cover comprising a main cover panel coupled to the axle and a pair of side covers coupled to the main cover, the pair of side covers being coupled to a pair of outer edges of the main cover panel, the main cover panel having a proximal end coupled to the axle and a distal end extending through the cover aperture, the cover being windingly retractable and extendable around the axle;
a hook coupled to the main cover panel, the hook being coupled to the distal end and configured to selectively engage a bumper of a vehicle; and
a pull handle coupled to the main cover panel, the pull handle being coupled to the distal end, the hook extending past the pull handle.

7. A retractable vehicle cover apparatus comprising:
a housing having a housing front side, a housing back side, a housing left side, a housing right side, a housing top side, and a housing bottom side defining a housing inside, the housing frontside having a cover aperture extending through to the housing inside;
a plurality of adjustable feet coupled to the housing, the plurality of adjustable feet being coupled to the housing bottom side;
an axle coupled to the housing, the axle being rotatably coupled to the housing left side and the housing right side within the housing inside;
a crank coupled to the housing, the crank extending through the housing right side to be in operational communication with the axle;
a cover coupled to the axle, the cover comprising a main cover panel coupled to the axle and a pair of side covers coupled to the main cover, the pair of side covers being coupled to a pair of outer edges of the main cover panel, the main cover panel having a proximal end coupled to the axle and a distal end extending through the cover aperture, the cover being windingly retractable and extendable around the axle;
a hook coupled to the main cover panel, the hook being coupled to the distal end and configured to selectively engage a bumper of a vehicle; and
the main cover panel comprising an outer cover side, an inner cover side, and a flexible cushion layer coupled therebetween, the outer cover side being a waterproof material, the inner cover side being a soft material, and the cushion layer having a sinusoidal cross-section.

8. A retractable vehicle cover apparatus comprising:
a housing having a housing front side, a housing back side, a housing left side, a housing right side, a housing top side, and a housing bottom side defining a housing inside, the housing frontside having a cover aperture extending through to the housing inside;
a plurality of adjustable feet coupled to the housing, the plurality of adjustable feet being coupled to the housing bottom side;
an axle coupled to the housing, the axle being rotatably coupled to the housing left side and the housing right side within the housing inside;
a crank coupled to the housing, the crank extending through the housing right side to be in operational communication with the axle;
a cover coupled to the axle, the cover comprising a main cover panel coupled to the axle and a pair of side covers coupled to the main cover, the pair of side covers being coupled to a pair of outer edges of the main cover panel, the main cover panel having a proximal end coupled to the axle and a distal end extending through the cover aperture, the cover being windingly retractable and extendable around the axle;
a hook coupled to the main cover panel, the hook being coupled to the distal end and configured to selectively engage a bumper of a vehicle; and
a heating element coupled to the housing, the heating element being coupled within the housing inside; a power supply coupled to the housing, the power supply being in operational communication with the heating element.

9. The retractable vehicle cover apparatus of claim 8 further comprising the power supply being a solar panel system.

10. The retractable vehicle cover apparatus of claim 9 further comprising the solar panel system having a panel mount coupled to the housing top side, a pair of triangular panel arms coupled to the panel mount, and a solar cell panel pivotably coupled to the pair of panel arms.

11. A retractable vehicle cover apparatus comprising:
a housing having a housing front side, a housing back side, a housing left side, a housing right side, a housing top side, and a housing bottom side defining a housing inside, the housing frontside having a cover aperture extending through to the housing inside;
a plurality of adjustable feet coupled to the housing, the plurality of adjustable feet being coupled to the housing bottom side;
an axle coupled to the housing, the axle being rotatably coupled to the housing left side and the housing right side within the housing inside;
a crank coupled to the housing, the crank extending through the housing right side to be in operational communication with the axle, the crank having a rotatable handle portion;
a cover coupled to the axle, the cover comprising a main cover panel coupled to the axle and a pair of side covers coupled to the main cover, the pair of side covers being coupled to a pair of outer edges of the main cover panel, the main cover panel having a proximal end coupled to the axle and a distal end extending through the cover aperture, the cover being windingly retractable and extendable around the axle, each of the housing front side and the housing back side having a rounded bulge portion to accommodate the cover when wound around the axle, the main cover panel comprising an outer cover side, an inner cover side, and a flexible cushion layer coupled therebetween, the outer cover side being a waterproof material, the inner cover side being a soft material, and the cushion layer having a sinusoidal cross-section;

a plurality of wheels coupled to the cover, the plurality of wheels being coupled to the inner cover side of the main cover panel, the plurality of wheels being configured to rest on a roof of the vehicle when the cover is fully extended from the housing, each wheel having a wheel mount coupled to the inner cover side and a rubberized tire coupled to the wheel mount;

a pull handle coupled to the main cover panel, the pull handle being coupled to the distal end;

a hook coupled to the main cover panel, the hook being coupled to the distal end and configured to selectively engage a bumper of the vehicle, the hook extending past the pull handle;

a heating element coupled to the housing, the heating element being coupled within the housing inside; and a power supply coupled to the housing, the power supply being in operational communication with the heating element, the power supply being a solar panel system having a panel mount coupled to the housing top side, a pair of triangular panel arms coupled to the panel mount, and a solar cell panel pivotably coupled to the pair of panel arms.

\* \* \* \* \*